3,429,719
SAND COMPOSITIONS
Russell E. Manley, 25 Skyline Drive,
Ogden Dunes, Ind.
No Drawing. Filed Oct. 11, 1965, Ser. No. 494,959
U.S. Cl. 106—38.3                                    4 Claims
Int. Cl. C04b 35/14; B22c 1/02

ABSTRACT OF THE DISCLOSURE

A reconstituted foundry molding sand composition wherein the previously used sand composition includes an unused additive of 200 mesh silica sand in a predetermined weight range; and a method of reconstituting previously used molding sand compositions which includes the steps of removing calcined clay and carbonaceous materials from the previously used sand composition and the addition thereto of a predetermined quantity of unused 200 mesh silica sand to complete the reconstitution of the previously used sand composition and to enhance the water retention properties of the composition.

---

This invention relates to new and improved reconstituted foundry molding sand compositions and is more particularly directed to new and improved re-useable clay bonded, molding sand compositions and to methods of making such sand compositions.

Heretofore, difficulty has been encountered in efficiently re-using molding sand compositions in foundry molding operations primarily because the sand compositions lose their water retention and bonding properties after a number of such re-uses.

Maintenance of acceptable water retention properties of such sand compositions is required so that the clay and sand components of the sand composition will properly bind to obtain, during re-use of the compositions, the desired moldability of the sand composition, to produce the desired molding configuration details, such as sharp corner and pockets or recess details of the metal article being molded, and to reduce reject metal loss attributable to defects caused by use of such compositions which have lost their desired water retention properties.

Clay bonded sand compositions used in foundry molding operations are referred to in the trade as "green" sand or "bake molded" sand. Such sand compositions which have lost their water retention and bonding properties are referred to in the trade as "dead" sands.

In foundry applications, "green" molding sand compositions are preferably re-used continuously on a rapid re-use basis. In re-use of the sand compositions and after the sand is used in the mold, it is broken up and treated, for example, for the removal of burned or calcined clay and carbonaceous materials, and then reconstituted by the addition of the sand component and other additives. The reconstituted sand composition is than re-used in the mold. This reconstitution procedure is repeated after each molding use of the sand composition. However, in these repeated re-use operations, particularly where the sand composition is continuously and rapidly re-used, the sand composition loses its water retention properties which are required to promote binding of the clay and sand and other components of the composition into an acceptable molding sand compositions, i.e., becomes "dead" sand. Because of the loss of its water retention properties, the "dead" sand does not have the required degree of moldability that "green" sand has and will not form from the metal being molded the desired sharp corners or pockets. Consequently, the re-use of "dead" sand results in rejected metal articles and consequent scrapping of the reject metal articles. It has been estimated that the use of a "dead" sand can increase the scrap two to five times over normal.

In order to control the water retention and moldability properties of re-used sand compositions before the sand compositions become "dead" sand, unsatisfactory attempts have been made in the prior art to control the quantity of water added to the sand composition during the reconstituting procedures because it is believed that this water contributes to bonding of clay and sand to form an acceptable sand composition having the desired molding properties. However, control of the quantity of water added during reconstitution of the sand composition is not the solution to the problem of "dead" sand because the re-used sand compositions include a certain quantity of burned-out or calcined clay and coked carbonaceous materials even though the sand composition in the reconstitution procedure is subject to air removal devices, such as exhaust fans, to remove calcined clay and carbonaceous materials.

It is desirable to remove calcined clay because such clay has a deleterious effect on the bonding, and, thus, moldability properties of the sand composition, particularly the bonding properties between the sand and clay because calcined clay does not have the required bonding affinity for sand.

In addition to the use of water or other moisture control additives to enhance the water retention properties of re-used sand compositions, prior art sand composition reconstitution procedures have included, as aforesaid, the use of draft fan devices to withdraw the lighter weight calcined clay and coked carbonaceous materials and coated sand particles from the sand composition.

However, the use of such devices results also in the removal of the sand "fines" and particularly the 200 mesh sand "fines." While new sand added as a component to the sand composition during the reconstitution procedure replenished some of the 200 mesh sand "fines," it has been found such new sand does not replace the quantity of 200 mesh "fines" removed by these fan devices. Moreover, the quantity of 200 mesh "fines" removed by these devices is not replaced, even during continuous re-use and addition of new sand to the reconstituted sand composition during each of the reconstitution procedure because the fan removal devices are used in each reconstitution procedure.

I have found that the water retention properties of used clay molding sand compositions may be maintained and the attendant required degree of moldability of the used sand composition achieved by the addition to the sand composition of 200 mesh screen size silica sand periodically during the reconstituting procedures and that such addition substantially eliminates the requirement for moisture control of excess "free" water additives or cellulose material additives. In addition, with use of the present invention, the metal articles rejects caused by use of "dead" sand is reduced to normal.

It is, therefore, an object of the present invention to provide new and improved reconstituted foundry molding sand compositions.

The coked carbonaceous materials likewise do not have the required bonding affinity for clay and in addition have the unwanted property for absorbing water. Thus, because these coked carbonaceous materials and the calcined clay absorb water, water in excess of that required to enhance the water retention properties of the sand composition must be added during the reconstituting procedure. The quantity of water absorbed by the coked carbonaceous materials and the calcined clay is called "free water" in the trade. When the hot metal to be molded is contacted with the sand composition in the molding operation, the "free water" flash-evaporates to form vapor which reacts with the hot metal vapor to form oxides which coat the clay and sand grains. Such coated grains do not have the affinity for water of a new silica grain and this results in more "free" or losely held water. The loss of this affinity for water reduces the required bonding affinity for clay and, thus in re-use, further reduce the moldability properties of the sand compositions.

Because of these problems caused by the presence of such calcined clay and coked carbonaceous materials in the sand compositions, where an excess of water is used in reconstitution of the sand compositions, attempts have been made in the prior art to control the water retention properties of re-used sand compositions by the use of cellulose materials, or other materials such as glycerine and ethylene glycol to hold moisture in the sand composition without requiring the addition of an undue amount of water during the reconstitution and storing of the sand compositions for re-use. However, these moisture control materials have been characterized by being volatile, and, thus, are to be re-added to the sand compositions during each reconstituting procedure. In addition, use of volatile materials under any circumstances presents a safety hazard.

It is another object of the present invention to provide new and imporved reconstituted, clay-bonded, foundry molding sand compositions.

Another object of the present invention is to provide new and improved reconstituted clay-bonded foundry molding sand compositions having a predetermined quantity of 200 mesh sand therein.

A further object of the present invention is to provide a new and improved method of reconstituting clay-bonded, foundry molding sand compositions.

These and other objects, features and advantages of the present invention will become readily apparent from a careful consideration of the following detailed description wherein examples are given by way of illustration and not by way of limitation.

As presently prepared in the art, a "green" or "baked mold" foundry clay bonded molding sand composition is prepared and used in a foundry metal molding operation. A typical sand composition for such use is one having ingredients in the following percentages by weight.

| Ingredients: | Percentage range, percent |
| --- | --- |
| Sand | 87–75 |
| Clay | 5–9 |
| Water | 2½–5½ |
| Ground coal | 4–8 |
| Cellulose | ½–2 |

The "green" sand composition is to be continuously re-used in a metal molding operation in which the sand composition is formed in a mold, used to form a metal article, the sand composition broken up, reconstituted, and then re-used in a mold.

To prevent the molding sand composition from losing its water retention properties and becoming "dead" sand, 200 mesh silica sand is added in accordance with the present invention to the sand composition. The quantity of 200 mesh silica sand added based on the total quantity of sand present in the composition is preferably in the weight range of from about .25% to 10% with the preferred weight ranges being from about .25% to about 3% and from about 3% to 6%, and with best results being achieved with the 200 mesh sand being added to the used sand composition in a quantity by weight to bring the total 200 mesh sand in the reconstituted sand composition substantially equal to 5% of the total quantity of sand present in the composition.

A preferred 200 mesh silica sand is obtained from the St. Peter's deposit at Troy Grove, Ill., which has been washed and sepaarted from coarser particles, dried and graded so that 90% of the silica sand passes through a 100 mesh and so that 90% of the silica sand is retained on a 270 mesh with predominately 200 mesh sand. However, sand of a similar size from other sources will give equivalent results.

In reconstituting the sand composition for re-use, a sufficient quantity of clay by weight is added to the used sand composition to result in the clay representing 5% to 12% of the sand composiiton, if the sand composition is not a naturally bonded sand, and 5% to 20% if the sand is naturally bonded.

Analysis shows that in such re-used compositions the carbonaceous materials, such as ground coal will be present in the range of 3 to 8% and moisture in the range of 3 to 7% depending primarily on the percentage of clay in the composition is added. The re-used sand including the 5% 200 mesh silica sand represents the remainder of the composition except where other additives are present but these additives are present only in minor amounts and depend primarily on the preferences of the foundry man in most instances.

As a specific example of a re-usable sand composition of the present invention 5% new sand (other than the 200 mesh sand) is added to a used sand composition and clay, water and other additives added to bring the quantities by weight of the ingredients of the sand composition within the ranges specified in the paragraph immediately above. Preferably these ingredients and the 200 mesh are added at the muller or just before the muller and then re-used.

It is found that if the sand composition is re-used on the average of 15 times a day a single addition of as low as 1% of 200 mesh silica sand will maintain the desired water retention properties of the sand composition. In addition the percentage of water added, when compared to the percentage added for reconstitution purposes in the prior art, is less.

Thus, with the present invention, it is readily apparent that the water retention properties and thus the moldability of the sand composition are maintained at desired levels with economies in the reconstituting procedure.

Although various modifications and alternations of the present invention will be readily apparent to those versed in the art, it should be understood that what is desired to be embodied within the scope of the patent warranted hereon, are all such embodiments as reasonably and properly fall within the scope of the contribution to the art hereby made.

I claim:

1. In a method of reconstituted clay-bonded foundry molded sand compositions to enhance the water retention properties thereof, including the steps of removing calcined clay and carbonaceous materials from the previously used sand composition, the imporvement comprising adding unused 200 mesh silica sand to the composition in a quantity by weight in the range of from about .25% to about 10% of the total quantity of sand present by weight in the composition.

2. The method of claim 1, wherein the unused 200 mesh silica sand is added in a quantity equal to about 5% of the total quantity of sand present in the composition.

3. The method of claim 1, wherein the 200 mesh silica sand is added in a quantity sufficient to maintain the total 200 mesh silica sand present in the composition at a predetermined level of about .25% to 3%.

4. The method of claim 1 wherein the 200 mesh silica sand is added in a quantity sufficient to maintain the total 200 mesh present in the composiiton at a predetermined level preferably in the 3% to 6% range.

References Cited
UNITED STATES PATENTS

| | | | |
|---|---|---|---|
| 2,237,592 | 4/1941 | Dunbeck | 106—38.9 |
| 2,256,456 | 9/1941 | Dietert | 106—38.9 |
| 2,389,543 | 11/1945 | Pavlish et al. | 106—38.9 |
| 2,504,133 | 4/1950 | Kerlin | 106—38.9 |
| 2,586,814 | 2/1952 | Greenewald | 106—38.9 |

JULIUS FROME, *Primary Examiner.*

L. HAYES, *Assistant Examiner.*

U.S. Cl. X.R.

106—38.9, 69, 71